A. LINK.
SAW SET.
APPLICATION FILED MAR. 31, 1910.
973,282.
Patented Oct. 18, 1910.
2 SHEETS—SHEET 1.
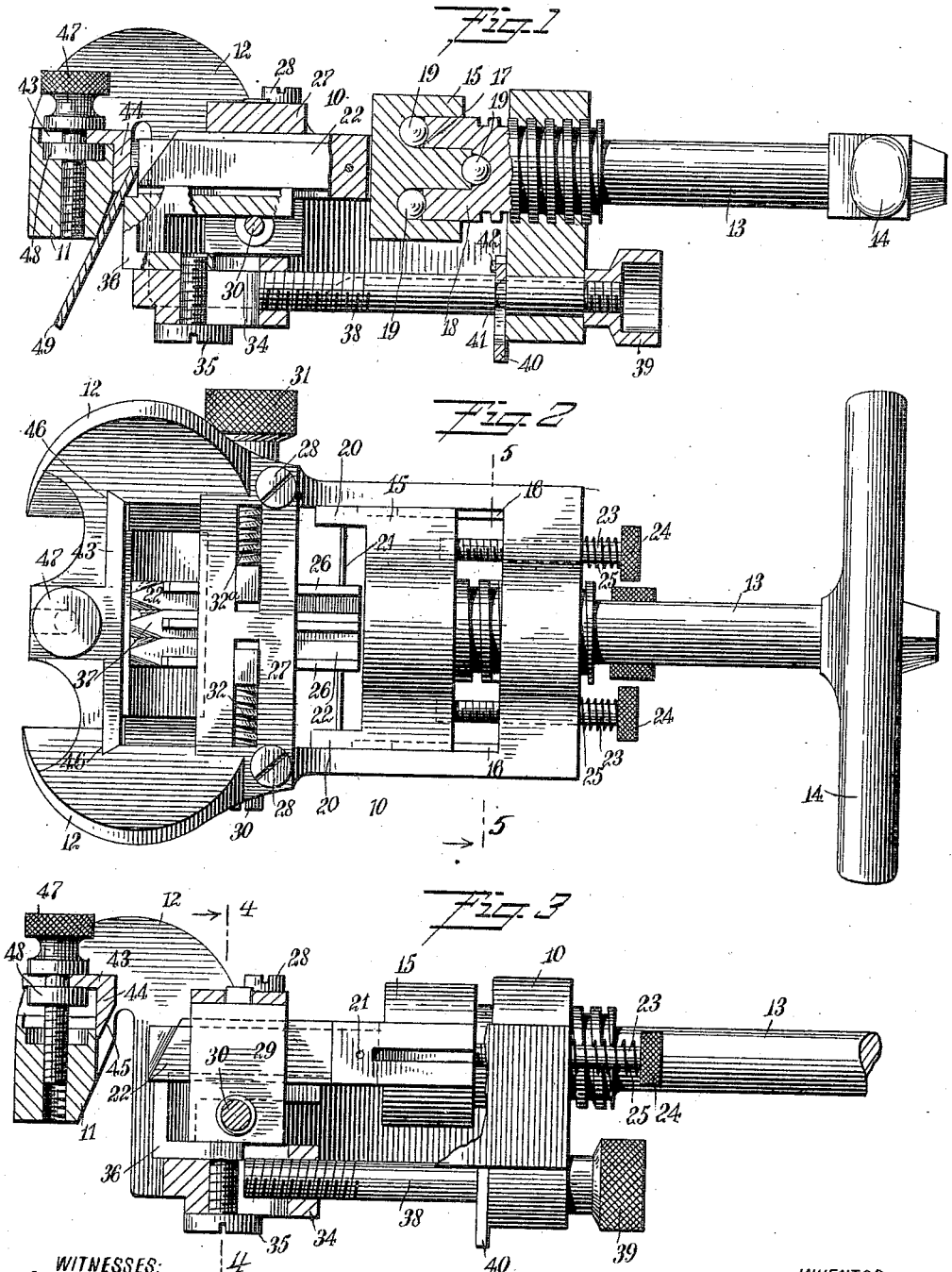
WITNESSES:
E. G. Bromley
P. A. Hoster
INVENTOR
Alexander Link
BY
ATTORNEYS A. LINK.
SAW SET.
APPLICATION FILED MAR. 31, 1910.
973,282.
Patented Oct. 18, 1910.
2 SHEETS—SHEET 2.
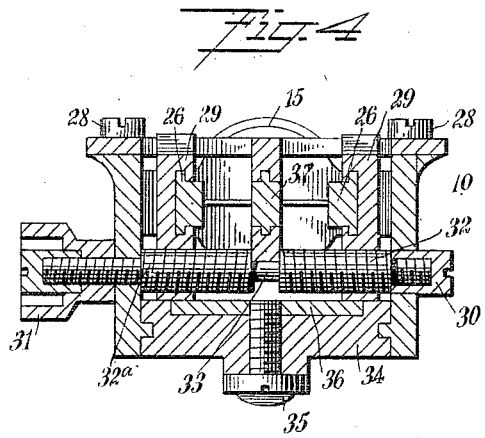
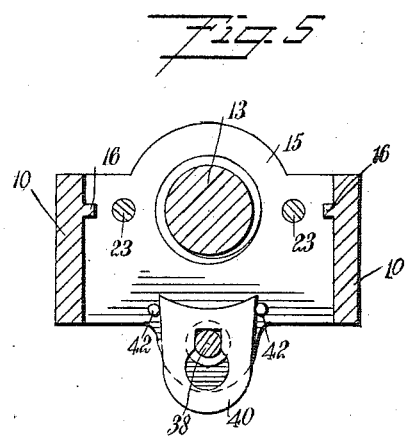
WITNESSES:
E. G. Bromley,
P. A. Hostel
INVENTOR
Alexander Link
BY Munn & Co.
ATTORNEYS

UNITED STATES PATENT OFFICE.

ALEXANDER LINK, OF PHOENIX, ARIZONA TERRITORY.

SAW-SET.

973,282.  Specification of Letters Patent.  Patented Oct. 18, 1910.

Application filed March 31, 1910. Serial No. 552,622.

*To all whom it may concern:*

Be it known that I, ALEXANDER LINK, a citizen of the United States, and a resident of Phoenix, in the county of Maricopa and Territory of Arizona, have invented a new and Improved Saw-Set, of which the following is a full, clear, and exact description.

The object of the invention is to provide a saw set for setting the teeth of saws, regardless of the kind of saw or the number of teeth on the saw to be set.

For the purpose mentioned use is made of a frame for engagement with the saw, and provided with spaced heads mounted in the frame and adapted to move toward and from the teeth of the saw, and means on the frame for adjusting the heads relatively to each other.

Reference is to be had to the accompanying drawings forming a part of this specification, in which similar characters of reference indicate corresponding parts in all the views, and in which—

Figure 1 is a partially sectional side elevation of my invention, showing a saw clamped therein with one of the teeth of the saw being set; Fig. 2 is a plan view of my invention; Fig. 3 is a fragmentary side elevation, disclosing various features, parts being broken away to show the underlying structure; Fig. 4 is a sectional view, taken on the line 4—4 in Fig. 3, looking in the direction of the arrow, and Fig. 5 is a sectional view taken on the line 5—5 in Fig. 2 and looking in the direction of the arrow.

Referring to the various figures, I employ a frame 10, having a depending lug 11 at the forward end and provided with upwardly and outwardly extending lips 12. Screw-threadedly mounted on the frame 10 at the rear end thereof is a screw 13, provided at one end with a handle 14, and having the other end of the rod in engagement with a follower 15, mounted to slide on guides 16 of the frame 10. For the purpose of reducing frictional contact the follower 15 has a circular groove 17 therein, and the screw 13 has a circular lug 18 adapted to fit into the groove 17, and suitable ball bearings 19 are interposed between the ends of the screw 13 and the follower 15, to permit the screw 13 to more easily turn in the follower 15. The forward end of the follower 15 is provided with forwardly-extending lugs 20, on both sides of the follower 15, and mounted in the said lugs 20 is a rod 21 on which are slidably mounted a number of heads 22. Mounted in the frame 10 are screws 23, provided with knurled heads 24 and encircled, intermediate the frame 10 and the heads 24, by springs 25, as will be readily seen by reference to Fig. 2. The other ends of the screws 23 screw-threadedly engage the rear end of the follower 15, and tend to hold the follower 15 against the end of the screw 13. The upper sides of the heads 22 are provided with guideways 26, adapted to engage a guide 27, secured to the frame 10 by means of suitable screws 28, and the said guide 27 is provided with depending tongues or auxiliary guides 29, adapted to engage the outermost heads 26. An adjustable screw 30 having a knurled head 31 is mounted in the frame 10, and engages the auxiliary guides 29 in engagement with the outer heads 26. The screw 30 is provided with two oppositely-extending threads 32 and $32^a$, with a space 33 intermediate the said threads and centrally disposed on the said screw. By means of this construction, when the screw 30 is turned, the outer heads 26 will be adapted to move either toward or away from each other, as will be seen by referring to Fig. 4. On the under side of the frame 10 is slidably mounted a clamp 34, having secured thereto by a screw 35 a right-angled member 36, in engagement with the under side of a head 37 mounted on the spaced portion 33 of the screw 30. The clamp 34 is conveniently controlled by a screw 38, mounted in the frame 10 and provided with a knurled head 39, for more easily operating the same, to move the clamp 34 forwardly or rearwardly. As the head 37 is mounted in the spaced portion 33, when the screw 30 is operated the head 37 will not move transversely of the frame 10, as do the heads 26, but the head 37 will remain stationary at all times with respect to the heads 26. A lug 40 is mounted on the screw 38 and held in position by small outwardly-extending points 42, secured on the frame 10, the purpose of the said lug 40 being to enable the screw 38 to be turned to move the clamp 34 forwardly or rearwardly, as will be more fully referred to hereinafter. On the upper side of the frame 10, at the forward end and intermediate the lips 12, is an anvil 43 extending transversely of the frame 10, as will be easily seen by referring to Fig. 2. The anvil 43 has a downwardly-extending portion 44 provided with a beveled edge 45, and the said downwardly-extending portion 44 is adapted to slide in grooves 46 on both sides of the frame 10. A screw 47 engages the anvil 43, and is provided with a fixed washer 48, disposed underneath the anvil 43. By operating the screw 47, the anvil 43 can be raised or lowered to any convenient height with respect to the heads 26 and 37. The heads 22 and the center head 37 are pointed at their forward ends, so that when they are moved to engage the teeth of a saw, the points of the said heads will bear directly on the exposed side of the teeth of the saw.

When it is desired to set a saw 49 with my device, the saw is secured to the frame 10 by the clamp 34 holding the saw against the depending portion 11 of the frame 10 and against the bevel 45 of the anvil 43. The saw is so clamped in the frame 10 that the point of the center head 37 will be directly opposite one of the teeth of the saw 49. The screw 30 is then turned so that the outer heads 22 will each be opposite teeth on the saw, as is the center head 37, and the positioning of the heads opposite the teeth of the saw is preferably arranged so that every other tooth will be in alinement with a head of the saw set. The handle 14 is then turned to the right, and the heads 22 and 37 are moved forwardly, as has been heretofore described, and engage the mentioned teeth, to bend the same outwardly against the anvil 43. After every other tooth of the saw has been set as described, the saw is unclamped from the saw set, turned around and reclamped in the saw set, so that the teeth not previously set aline with the heads 22 and 37, and the operation of setting the teeth is repeated as heretofore described.

It will be understood that any number of heads can be employed and operated in the manner described, and it will be easily seen that only for the purpose of disclosing the features of my device I employ a saw set with three heads.

It will also be understood that I do not limit myself to the precise construction shown, the scope of my invention being fully disclosed in the appended claims.

Having thus described my invention, I claim as new and desire to secure by Letters Patent:

1. A saw set, comprising a frame for engagement with a saw, spaced heads mounted in the frame to move toward and from the teeth of the saw, an adjusting screw on the said frame for moving the heads transversely of the frame and relatively to each other, a right-handed thread on the said screw and engaging one of the said heads, for moving the same in one direction, a left-handed thread on the said screw, engaging one of the said heads, for moving the same in an opposite direction, and screw-threaded means engaging the said heads, to operate the same to move toward or from the teeth of the saw.

2. A saw set, comprising a frame for engagement with a saw, spaced heads mounted in the frame, to move toward and from the teeth of the saw with the outer heads adapted to move transversely of the frame and the center head adapted to remain stationary with respect to the transversely movable heads, means for moving the said outer heads transversely, means for moving the said heads toward and from the teeth of the saw, and an anvil mounted on the said frame and adapted to be adjusted.

3. A saw set comprising a frame, a guide thereon, auxiliary guides mounted to move transversely on the said guide, heads mounted to move on the auxiliary guides, means for moving the auxiliary guides transversely of the frame, and means for moving the heads longitudinally of the frame.

4. A saw set comprising a frame, an adjustable anvil on the frame, a guide on the frame, auxiliary guides mounted to move transversely on the guide, heads mounted to move on the auxiliary guides, a screw for operating the heads toward or from the anvil, and a screw for moving the guides transversely of the frame.

In testimony whereof I have signed my name to this specification in the presence of two subscribing witnesses.

ALEXANDER LINK.

Witnesses:
ROBERT W. LUTLEY,
THEO. J. GOODWIN.